(12) United States Patent
Minami et al.

(10) Patent No.: US 11,677,080 B2
(45) Date of Patent: Jun. 13, 2023

(54) ELECTROCHEMICAL ELEMENT, ELECTROCHEMICAL MODULE, SOLID OXIDE FUEL CELL AND MANUFACTURING METHOD

(71) Applicant: Osaka Gas Co., Ltd., Osaka (JP)

(72) Inventors: Kazuyuki Minami, Osaka (JP); Mitsuaki Echigo, Osaka (JP); Hisao Ohnishi, Osaka (JP); Yuji Tsuda, Osaka (JP); Kyohei Manabe, Osaka (JP); Osamu Yamazaki, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 268 days.

(21) Appl. No.: 16/497,478

(22) PCT Filed: Mar. 30, 2018

(86) PCT No.: PCT/JP2018/013691
§ 371 (c)(1),
(2) Date: Sep. 25, 2019

(87) PCT Pub. No.: WO2018/181924
PCT Pub. Date: Oct. 4, 2018

(65) Prior Publication Data
US 2021/0111413 A1    Apr. 15, 2021

(30) Foreign Application Priority Data
Mar. 31, 2017    (JP) .............................. JP2017-073206

(51) Int. Cl.
*H01M 4/90*    (2006.01)
*H01M 4/86*    (2006.01)
(Continued)

(52) U.S. Cl.
CPC ....... *H01M 4/9033* (2013.01); *H01M 4/8652* (2013.01); *H01M 4/8657* (2013.01);
(Continued)

(58) Field of Classification Search
CPC ............. H01M 4/8652; H01M 4/8657; H01M 4/8807; H01M 4/8882; H01M 4/8885;
(Continued)

(56) References Cited

U.S. PATENT DOCUMENTS

2009/0280376 A1* 11/2009 Chiba ................. H01M 4/9033
429/443
2010/0159356 A1    6/2010 Mahoney
(Continued)

FOREIGN PATENT DOCUMENTS

| | | |
|---|---|---|
| JP | 778616 A | 3/1995 |
| JP | 8259346 A | 10/1996 |

(Continued)

OTHER PUBLICATIONS

Xiong et al., Long-Term Cr Poisoning Effect on LSCF-GDC Composite Cathodes Sintered at Different Temperatures, Journal of The Electrochemical Society, 2016, 163 (9) F1091-F1099.

*Primary Examiner* — Brittany L Raymond
(74) *Attorney, Agent, or Firm* — The Webb Law Firm

(57) ABSTRACT

Provided is a low-cost electrochemical element that includes a high-performance electrode layer. The electrochemical element includes an electrode layer, and the electrode layer contains small particles and large particles. The small particles have a particle diameter of 200 nm or less in the electrode layer, and the large particles have a particle diameter of 500 nm or more in the electrode layer.

13 Claims, 6 Drawing Sheets

(51) Int. Cl.
  *H01M 4/88*     (2006.01)
  *H01M 8/1213*   (2016.01)

(52) U.S. Cl.
  CPC ....... *H01M 4/8807* (2013.01); *H01M 4/8882* (2013.01); *H01M 8/1213* (2013.01)

(58) Field of Classification Search
  CPC ... H01M 4/9033; H01M 8/1213; Y02E 60/50; Y02P 70/50
  See application file for complete search history.

(56) References Cited

U.S. PATENT DOCUMENTS

| | | | |
|---|---|---|---|
| 2010/0216047 A1* | 8/2010 | Marlin | H01M 4/8621 429/465 |
| 2012/0251917 A1 | 10/2012 | Son et al. | |
| 2012/0270139 A1 | 10/2012 | Park et al. | |
| 2014/0212791 A1 | 7/2014 | Okamoto | |
| 2017/0301941 A1 | 10/2017 | Echigo et al. | |
| 2018/0190993 A1* | 7/2018 | Nishiura | H01M 4/8652 |

FOREIGN PATENT DOCUMENTS

| | | | |
|---|---|---|---|
| JP | 2004362921 A | | 12/2004 |
| JP | 200612453 A | | 1/2006 |
| JP | 200632132 A | | 2/2006 |
| JP | 2010267631 A | | 11/2010 |
| JP | 201243801 A | | 3/2012 |
| JP | 2012104407 A | | 5/2012 |
| JP | 2012513096 A | | 6/2012 |
| JP | 2012221946 A | | 11/2012 |
| JP | 2012227142 A | | 11/2012 |
| JP | 201377397 A | | 4/2013 |
| JP | 2013126651 A | | 6/2013 |
| JP | 2013247006 A | | 12/2013 |
| JP | 2014146421 A | | 8/2014 |
| JP | 2015-088284 | * | 5/2015 |
| JP | 2015088284 A | | 5/2015 |
| JP | 201640323 A | | 3/2016 |
| JP | 201672037 A | | 5/2016 |
| JP | 2016225036 A | | 12/2016 |
| JP | 201710709 A | | 1/2017 |
| KR | 1020130022828 A | | 3/2013 |
| WO | 2011119698 A1 | | 9/2011 |
| WO | 2016043315 A1 | | 3/2016 |
| WO | WO 2017-002654 | * | 1/2017 |

* cited by examiner

ELECTROCHEMICAL ELEMENT, ELECTROCHEMICAL MODULE, SOLID OXIDE FUEL CELL AND MANUFACTURING METHOD

CROSS-REFERENCE TO RELATED APPLICATIONS

This application is the United States national phase of International Application No. PCT/JP2018/013691 filed Mar. 30, 2018, and claims priority to Japanese Patent Application No. 2017-073206 filed Mar. 31, 2017, the disclosures of which are hereby incorporated by reference in their entirety.

TECHNICAL FIELD

The present invention relates to an electrochemical element including an electrode layer, and the like.

BACKGROUND ART

In recent years, fuel cells that can generate electric power using fuel gas (hydrogen-containing gas) and oxygen-containing gas (air is commonly used) have been developed. Fuel cells have a structure in which an electrolyte layer is sandwiched between a fuel electrode and an air electrode. Fuel cells generate power by supplying fuel gas and oxygen-containing gas to the fuel electrode and the air electrode, respectively, and heating them to 1000 to 1050° C. (Patent Document 1). It is known that the air electrode reaction in fuel cells mainly progresses at a triple phase boundary between a phase having oxide-ion conductivity, a phase having electron conductivity, and a gas phase serving as a gas diffusion passage. Accordingly, an attempt has been made to produce a high-performance air electrode in which a triple phase boundary serving as a reaction site is large in length.

PRIOR ART DOCUMENTS

Patent Documents

Patent Document 1: JP 2016-225036A
Patent Document 2: JP 2012-221946A

DISCLOSURE OF THE INVENTION

Problem to be Solved by the Invention

Conventionally, an air electrode is produced through heating in a high-temperature range of 1100° C. to 1200° C. (Patent Document 1). However, with a conventional method, grain growth occurs due to heating in a high-temperature range, and therefore, it is not possible to produce an air electrode as a composite electrode constituted by fine particles. Thus, a high-performance electrode in which a triple phase boundary is sufficiently large in length cannot be obtained. To address this, a technique for producing a nano composite electrode by producing an air electrode through vapor deposition has been developed (Patent Document 2). However, when an air electrode is produced through vapor deposition, a three-dimensional gas diffusion passage is unlikely to be obtained due to a columnar structure being formed, and the electrode performance is insufficient. Also, there is a problem in that the production cost increases because vapor deposition is performed as a batch process under vacuum.

The present invention was achieved in light of the foregoing problems, and an object of the present invention is to provide a low-cost electrochemical element that includes a high-performance electrode layer.

Means for Solving Problem

A characteristic configuration of an electrochemical element for achieving the object includes
an electrode layer,
wherein the electrode layer contains small particles and large particles,
the small particles have a particle diameter of 200 nm or less in the electrode layer, and
the large particles have a particle diameter of 500 nm or more in the electrode layer.

With the above-mentioned characteristic configuration, a high-performance electrode layer that includes a three-dimensional gas diffusion passage is formed, thus making it possible to realize a high-performance electrochemical element at low cost.

It is preferable that the small particles have a particle diameter of 200 nm or less because a high-performance electrode layer that more reliably includes a three-dimensional gas diffusion passage can be formed.

In addition, it is preferable that the large particles have a particle diameter of 500 nm or more because a high-performance electrode layer that more reliably includes a three-dimensional gas diffusion passage can be formed.

In another characteristic configuration of the electrochemical element according to the present invention, a material forming the small particles and a material forming the large particles are different from each other.

With the above-mentioned characteristic configuration, a high-performance electrode layer in which a triple phase boundary is large in length can be formed, for example, by using a substance having ion conductivity to form one type of particle out of the small particles and the large particles, and using a substance having electron conductivity to form the other type of particle.

It is preferable that at least one type of particles out of the small particles and the large particles is made of a ceria-based oxide because the electrode layer is formed as a high-performance electrode layer that includes a phase having high oxide-ion conductivity.

It is preferable that at least one type of particles out of the small particles and the large particles is made of a zirconia-based oxide because the electrode layer is formed as a high-performance electrode layer that includes a phase having high oxide-ion conductivity.

It is preferable that at least one type of particles out of the small particles and the large particles is made of a perovskite composite oxide because the electrode layer is formed as a high-performance electrode layer that includes a phase having both high electron conductivity and high catalytic activity for an oxygen reduction reaction.

It is preferable that the large particles are made of a perovskite composite oxide because a high-performance electrode layer in which a triple phase boundary is large in length can be formed due to a perovskite oxide, which has relatively favorable sinterability, serving as an aggregate.

When 50% or more of the large particles contained in the electrode layer have an aspect ratio of 2 or more, the aspect ratio being determined by dividing a length in a longitudinal direction by a length in a short direction, a three-dimensional gas diffusion passage of the electrode layer is more reliably formed, thus making it possible to further improve the performance of the electrode layer.

It is more preferable that the ratio of the particles having an aspect ratio of 2 or more is desirably 60% or more, and more desirably 70% or more because a three-dimensional gas diffusion passage is even more reliably formed.

In addition, it is more preferable that the aspect ratio is 2.5 or more because a three-dimensional gas diffusion passage is even more reliably formed.

When the electrode layer has a porosity of 20% or more and 40% or less, the electrode layer is more reliably provided with a triple phase boundary that is sufficiently large in length, thus making it possible to further improve the performance of the electrode layer. It is more preferable that the electrode layer has a porosity of 25% or more because a three-dimensional gas diffusion passage is more reliably formed, thus making it possible to further improve the performance of the electrode. Also, it is more preferable that the electrode layer has a porosity of 35% or less because the nano composite structure of the electrode is more reliably formed, thus making it possible to further improve the performance of the electrode.

A configuration in which the electrode layer includes a plurality of layers is also possible. This configuration is preferable because a plurality of functions that are to be provided to the electrode layer can be assigned to the respective layers in stages.

Another characteristic configuration of the electrochemical element according to the present invention includes an electrolyte layer, wherein the electrode layer includes a first layer and a second layer that is closer to the electrolyte layer than the first layer is, and the content of the large particles in the first layer is larger than the content of the large particles in the second layer.

With the above-mentioned characteristic configuration, the content of the large particles in the first layer is larger than that in the second layer, and therefore, a three-dimensional gas diffusion passage of the electrode layer is more reliably formed in the first layer, thus making it possible to further improve the performance of the electrode layer as a whole.

The electrochemical element may include a reaction preventing layer that is arranged between the electrode layer and the electrolyte layer. This configuration is preferable because the reaction preventing layer can suppress diffusion of the components of the electrode layer to the electrolyte layer, thus making it possible to maintain the high performance of the electrochemical element.

The electrochemical element may include a counter electrode layer that is arranged on a side opposite to the electrode layer with respect to the electrolyte layer. This configuration is preferable because an electrochemical element that includes an electrode layer and a counter electrode layer can be formed, and this electrochemical element can be easily applied to a fuel cell and the like.

The electrode layer may be an air electrode layer. This configuration is preferable because a high-performance air electrode layer can be formed that includes a three-dimensional gas diffusion passage and has high oxide-ion conductivity, high electron conductivity, and high catalytic activity for an oxygen reduction reaction.

The electrochemical element may include a current collection layer having electron conductivity, on/over a surface of the electrode layer on a side opposite to the electrolyte layer. This configuration is preferable because a high-performance electrochemical element with small current collection resistance can be formed.

The electrochemical element may be supported by a metal support. That is, the electrode layer, the electrolyte layer, the reaction preventing layer, the counter electrode layer, and the like, which are included in the electrochemical element, may be formed one on/over top of the other on/over the metal support. With this configuration, the electrochemical element can be supported by the metal support, which is inexpensive and tough, thus making it possible to reduce the used amount of expensive ceramic material and obtain an electrochemical element that has high strength as well as excellent reliability and durability. Furthermore, the processability is also excellent, thus making it possible to reduce the production cost.

In a characteristic configuration of an electrochemical module according to the present invention, a plurality of the above-described electrochemical elements are arranged in an assembled state.

With the above-mentioned characteristic configuration, the plurality of the above-described electrochemical elements are arranged in an assembled state, thus making it possible to obtain an electrochemical module that is compact, has high performance, and has excellent strength and reliability, while also suppressing material cost and processing cost.

A characteristic configuration of an electrochemical device according to the present invention includes at least the above-described electrochemical module and a reformer, and includes a fuel supply unit which supplies fuel gas containing a reducible component to the electrochemical module.

The above-mentioned characteristic configuration includes the electrochemical module and the reformer, and the fuel supply unit which supplies the fuel gas containing a reducible component to the electrochemical module, thus making it possible to realize an electrochemical device that uses an existing raw fuel supply infrastructure such as city gas and includes the electrochemical module that has excellent durability, reliability, and performance. Also, it is easier to construct a system that recycles unused fuel gas discharged from the electrochemical module, thus making it possible to realize a highly efficient electrochemical device.

A characteristic configuration of an electrochemical device according to the present invention includes at least the above-described electrochemical module, and an inverter that extracts electrical power from the electrochemical module.

The above-mentioned characteristic configuration is preferable because it makes it possible to boost, using an inverter, electrical output obtained from the electrochemical module that has excellent durability, reliability, and performance, or to convert a direct current into an alternating current, and thus makes it easy to use the electrical output obtained from the electrochemical module.

A characteristic configuration of an energy system according to the present invention includes the above-described electrochemical device, and a waste heat management unit that reuses heat discharged from the electrochemical device.

The above-mentioned characteristic configuration includes the electrochemical device and the waste heat management unit that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device.

A characteristic configuration of a solid oxide fuel cell according to the present invention includes the above-described electrochemical element, wherein a power generation reaction is caused in the electrochemical element.

The above-mentioned characteristic configuration makes it possible to realize a solid oxide fuel cell including a high-performance electrode layer. It should be noted that it is more preferable to configure a solid oxide fuel cell such that it can be operated in a temperature range of 650° C. or higher during the rated operation because a fuel cell system that uses hydrocarbon-based raw fuel such as city gas can be constructed such that waste heat discharged from a fuel cell can be used in place of heat required to convert raw fuel to hydrogen, and the power generation efficiency of the fuel cell system can thus be improved. Also, it is preferable to operate the solid oxide fuel cell in a temperature range of 900° C. or lower during the rated operation because damage to a support can be suppressed in the case where a metal support is used as the support. Furthermore, it is more preferable to operate the solid oxide fuel cell in a temperature range of 850° C. or lower because damage to the support can be further suppressed.

In a characteristic configuration of a manufacturing method for an electrochemical element for achieving the object, heating of the electrode layer is performed at a temperature of 800° C. or higher and lower than 1100° C.

With the above-mentioned characteristic configuration, a high-performance electrode layer that includes a three-dimensional gas diffusion passage is formed, thus making it possible to realize a high-performance electrochemical element at low cost.

It is more preferable to perform heating of the electrode layer at a temperature of 1050° C. or lower because grain growth of particles included in the electrode layer is suppressed, and a three-dimensional gas diffusion passage is more likely to be formed.

BEST MODES FOR CARRYING OUT THE INVENTION

First Embodiment

Hereinafter, an electrochemical element E and a solid oxide fuel cell (SOFC) according to this embodiment will be described with reference to FIG. 1. The electrochemical element E is used as a constituent element of a solid oxide fuel cell that receives a supply of air and fuel gas containing hydrogen and generates power, for example. It should be noted that when the positional relationship between layers and the like are described in the description below, a second electrode layer 6 side may be referred to as "upper portion" or "upper side", and a first electrode layer 2 side may be referred to as "lower portion" or "lower side", with respect to an electrolyte layer 4, for example. In addition, in a metal substrate 1, a surface on/over which the first electrode layer 2 is formed may be referred to as "front side", and a surface on an opposite side may be referred to as "back side".

Electrochemical Element

Figure 1:
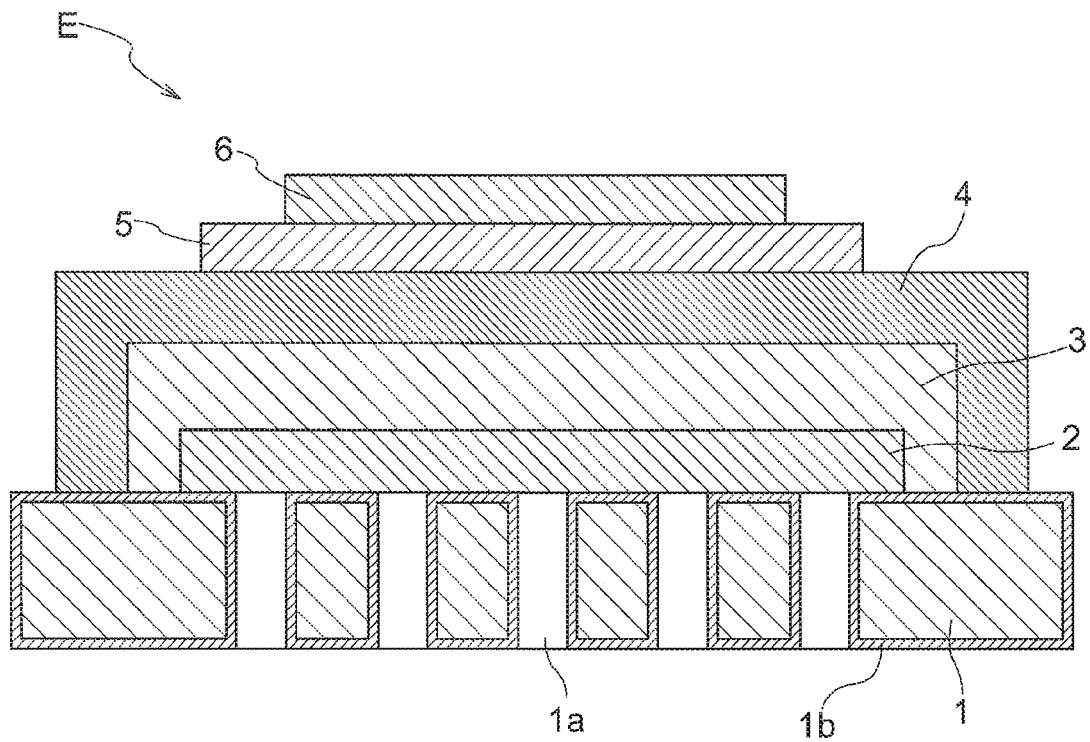
FIG. 1 is a schematic diagram showing a configuration of an electrochemical element.

As shown in FIG. 1, the electrochemical element E includes a metal substrate 1 (metal support), a first electrode layer 2 (counter electrode layer, fuel electrode layer) formed on/over the metal substrate 1, an intermediate layer 3 formed on/over the first electrode layer 2, and an electrolyte layer 4 formed on/over the intermediate layer 3. The electrochemical element E further includes a reaction preventing layer 5 formed on/over the electrolyte layer 4, and a second electrode layer 6 (electrode layer, air electrode layer) formed on/over the reaction preventing layer 5. Specifically, the second electrode layer 6 is formed above the electrolyte layer 4, and the reaction preventing layer 5 is formed between the electrolyte layer 4 and the second electrode layer 6. The electrochemical element E according to this embodiment includes the electrolyte layer 4, and the reaction preventing layer 5 arranged between the electrolyte layer 4 and the second electrode layer 6. The first electrode layer 2 is porous, and the electrolyte layer 4 is dense. A current collection layer having electron conductivity may be arranged on/over the second electrode layer 6, that is, on/over a surface of the second electrode layer 6 on a side opposite to the electrolyte layer 4. Examples of a material for forming the current collection layer include ceramic materials having electron conductivity, such as LSCF (Lanthanum Strontium Cobalt Ferrite) and LSM (Lanthanum Strontium Manganite).

Metal Substrate

The metal substrate 1 plays a role as a support that supports the first electrode layer 2, the intermediate layer 3, the electrolyte layer 4, and the like and maintains the strength of the electrochemical element E. A material that has excellent electron conductivity, thermal resistance, oxidation resistance, and corrosion resistance is used as the material for forming the metal substrate 1. Examples thereof include ferrite-based stainless steel, austenite-based stainless steel, and nickel-based alloys. In particular, alloys containing chromium are favorably used. It should be noted that although a plate-shaped metal substrate 1 is used as the metal support in this embodiment, a metal support having another shape such as a box shape or cylindrical shape can also be used.

It should be noted that the metal substrate 1 need only have a strength sufficient for serving as the support for forming the electrochemical element, and can have a thickness of approximately 0.1 mm to 2 mm, preferably approximately 0.1 mm to 1 mm, and more preferably approximately 0.1 mm to 0.5 mm, for example.

The metal substrate 1 is provided with a plurality of through holes 1a that penetrate the surface on the front side and the surface on the back side. It should be noted that the through holes 1a can be provided in the metal substrate 1 through mechanical, chemical, or optical piercing processing, for example. The through holes 1a have a function of transmitting gas from the surface on the back side of the metal substrate 1 to the surface on the front side thereof. Porous metal can also be used to impart gas permeability to the metal substrate 1. A metal sintered body, a metal foam, or the like can also be used as the metal substrate 1, for example.

A metal oxide thin layer 1b serving as a diffusion suppressing layer is provided on the surfaces of the metal substrate 1. That is, the diffusion suppressing layer is formed between the metal substrate 1 and the first electrode layer 2, which will be described later. The metal oxide thin layer 1b is provided not only on/over the surface of the metal substrate 1 exposed to the outside but also the surface (interface) that is in contact with the first electrode layer 2 and the inner surfaces of the through holes 1a. Element interdiffusion that occurs between the metal substrate 1 and the first electrode layer 2 can be suppressed due to this metal oxide thin layer 1b. For example, when ferrite-based stainless steel containing chromium is used in the metal substrate 1, the metal oxide thin layer 1b is mainly made of a chromium oxide. The metal oxide thin layer 1b containing the chromium oxide as the main component suppresses diffusion of chromium atoms and the like of the metal substrate 1 to the first electrode layer 2 and the electrolyte layer 4. The metal oxide thin layer 1b need only have such a thickness that allows both high diffusion preventing performance and low electric resistance to be achieved. For example, it is preferable that the thickness is on the order of submicrons, and specifically, it is more preferable that the average thickness is approximately 0.3 μm or more and 0.7 μm or less. It is more preferable that the minimum thickness is about 0.1 μm or more.

Also, it is preferable that the maximum thickness is about 1.1 μm or less.

The metal oxide thin layer 1b can be formed using various techniques, but it is favorable to use a technique of oxidizing the surface of the metal substrate 1 to obtain a metal oxide. Also, the metal oxide thin layer 1b may be formed on/over the surface of the metal substrate 1 by using a spray coating technique (a technique such as a thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide thin layer 1b may also contain a spinel phase that has high electron conductivity, or the like.

When a ferrite-based stainless steel material is used to form the metal substrate 1, its thermal expansion coefficient is close to that of YSZ (yttria-stabilized zirconia), GDC (gadolinium-doped ceria; also called CGO), or the like, which is used as the material for forming the first electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

First Electrode Layer

As shown in FIG. 1, the first electrode layer 2 can be provided as a thin layer in a region that is larger than the region provided with the through holes 1a, on/over the front surface of the metal substrate 1. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the used amount of expensive electrode layer material. The region provided with the through holes 1a is entirely covered with the first electrode layer 2. That is, the through holes 1a are formed inside the region of the metal substrate 1 in which the first electrode layer 2 is formed. In other words, all the through holes 1a are provided facing the first electrode layer 2.

A composite material such as NiO-GDC, Ni-GDC, NiO—YSZ, Ni—YSZ, CuO—CeO$_2$, or Cu—CeO$_2$ can be used as the material for forming the first electrode layer 2, for example. In these examples, GDC, YSZ, and CeO$_2$ can be called the aggregate of the composite material. It should be noted that it is preferable to form the first electrode layer 2 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable first electrode layer 2 is obtained without using heating in a high temperature range of higher than 1100° C., for example. Therefore, this is preferable due to being able to prevent damage to the metal substrate 1, suppress element interdiffusion between the metal substrate 1 and the first electrode layer 2, and realize an electrochemical element that has excellent durability. Furthermore, using low-temperature heating makes it possible to facilitate handling of raw materials and is thus more preferable.

The inside and the surface of the first electrode layer 2 are provided with a plurality of pores in order to impart gas permeability to the first electrode layer 2.

That is, the first electrode layer 2 is formed as a porous layer. The first electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1—porosity", and is equivalent to relative density.

Intermediate Layer

As shown in FIG. 1, the intermediate layer 3 can be formed as a thin layer on/over the first electrode layer 2 so as to cover the first electrode layer 2. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the used amount of expensive intermediate layer material. YSZ (yttria-stabilized zirconia), SSZ (scandium-stabilized zirconia), GDC (gadolinium-doped ceria), YDC (yttrium-doped ceria), SDC (samarium-doped ceria), or the like can be used as the material for forming the intermediate layer 3. In particular, ceria-based ceramics are favorably used.

It is preferable to form the intermediate layer 3 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using heating in a high temperature range of higher than 1100° C., for example. Therefore, it is possible to prevent damage to the metal substrate 1, suppress element interdiffusion between the metal substrate 1 and the first electrode layer 2, and realize an electrochemical element E that has excellent durability.

Furthermore, using low-temperature heating makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer

As shown in FIG. 1, the electrolyte layer 4 is formed as a thin layer on/over the intermediate layer 3 so as to cover the first electrode layer 2 and the intermediate layer 3. The electrolyte layer 4 can also be formed as a thin film having a thickness of 10 µm or less. Specifically, as shown in FIG. 1, the electrolyte layer 4 is provided on/over both the intermediate layer 3 and the metal substrate 1 (spanning the intermediate layer 3 and the metal substrate 1). Configuring the electrolyte layer 4 in this manner and joining the electrolyte layer 4 to the metal substrate 1 make it possible to allow the electrochemical element to have excellent toughness as a whole.

Also, as shown in FIG. 1, the electrolyte layer 4 is provided in a region that is larger than the region provided with the through holes 1a, on/over the front surface of the metal substrate 1. That is, the through holes 1a are formed inside the region of the metal substrate 1 in which the electrolyte layer 4 is formed.

The leakage of gas from the first electrode layer 2 and the intermediate layer 3 can be suppressed in the vicinity of the electrolyte layer 4. A description of this will be given. When the electrochemical element E is used as a constituent element of a SOFC, gas is supplied from the back side of the metal substrate 1 through the through holes 1a to the first electrode layer 2 during the operation of the SOFC. In a region where the electrolyte layer 4 is in contact with the metal substrate 1, leakage of gas can be suppressed without providing another member such as a gasket. It should be noted that although the entire vicinity of the first electrode layer 2 is covered with the electrolyte layer 4 in this embodiment, a configuration in which the electrolyte layer 4 is provided on/over the first electrode layer 2 and the intermediate layer 3 and a gasket or the like is provided in its vicinity may also be adopted.

YSZ (yttria-stabilized zirconia), SSZ (scandium-stabilized zirconia), GDC (gadolinium-doped ceria), YDC (yttrium-doped ceria), SDC (samarium-doped ceria), LSGM (strontium- and magnesium-doped lanthanum gallate), or the like can be used as the material for forming the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material for forming the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and increased gas barrier properties is obtained without using heating in a high temperature range of higher than 1100° C., for example. Therefore, it is possible to prevent damage to the metal substrate 1, suppress element interdiffusion between the metal substrate 1 and the first electrode layer 2, and realize an electrochemical element E that has excellent performance and durability. In particular, using low-temperature heating, a spray coating technique, or the like makes it possible to realize a low-cost element and is thus preferable. Furthermore, using a spray coating technique makes it easy to obtain, in a low temperature range, an electrolyte layer that is dense and has high gas-tightness and increased gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and increased gas barrier properties can be easily formed due to such a dense electrolyte layer being included as a portion of the electrolyte layer even when the electrolyte layer has a multilayer configuration.

Reaction Preventing Layer

The reaction preventing layer 5 can be formed as a thin layer on/over the electrolyte layer 4. When it is formed as a thin layer, the thickness can be set to approximately 1 µm to 100 µm, preferably approximately 2 µm to 50 µm, and more preferably 3 µm or more and 15 µm or less, for example. This thickness makes it possible to ensure sufficient performance while also achieving cost reduction by reducing the used amount of expensive reaction preventing layer material.

As the material for forming the reaction preventing layer 5, a material capable of preventing reactions between the components of the electrolyte layer 4 and the components of the second electrode layer 6 is used. Introducing the reaction preventing layer 5 between the electrolyte layer 4 and the second electrode layer 6 effectively suppresses reactions between the material constituting the second electrode layer 6 and the material constituting the electrolyte layer 4 and makes it possible to improve long-term stability in the performance of the electrochemical element E.

In this embodiment, a material containing Ce is used as the material for forming the reaction preventing layer 5. Moreover, a material containing at least one element selected from the group consisting of Sm, Gd, and Y is favorably used as the material for forming the reaction preventing layer 5. It is sufficient that the formed reaction preventing layer 5 contains at least one element selected from the group consisting of Sm, Gd, and Y, and the total content of these elements is 1.0 mass % or more and 10 mass % or less.

Forming the reaction preventing layer 5 using, as appropriate, a method through which the reaction preventing layer 5 can be formed at a treatment temperature of 1100° C. or lower makes it possible to suppress damage to the metal substrate 1, suppress element interdiffusion between the metal substrate 1 and the first electrode layer 2, and realize an electrochemical element E that has excellent performance and durability, and is thus preferable. For example, the reaction preventing layer 5 can be formed using, as appropriate, low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Second Electrode Layer

The second electrode layer 6 can be formed as a thin layer on/over the reaction preventing layer 5. When it is formed as a thin layer, the thickness can be set to approximately 1 µm to 100 µm, and preferably approximately 5 µm to 50 µm, for example. This thickness makes it possible to ensure sufficient electrode performance while also achieving cost reduction by reducing the used amount of expensive second electrode layer material.

In this embodiment, the second electrode layer 6 contains large particles and small particles. The small particles have a particle diameter of 200 nm or less in a state in which they are contained in the second electrode layer 6. The large particles have a particle diameter of 500 nm or more in a state in which they are contained in the second electrode layer 6. Thus, a porous and fine open pore structure is formed in the second electrode layer 6, that is, a high-performance second electrode layer 6 that has a three-dimensional gas diffusion passage is obtained. In particular, the second electrode layer 6 is formed such that the porosity is 20% or more and 40% or less.

It is preferable that many of the large particles contained in the second electrode layer 6 have an elongated shape. For example, it is preferable that many of them have a configuration in which the length in the longitudinal direction is two or more times longer than the length in the short direction. For example, it is preferable that many of the large particles have an aspect ratio of 2 or more, the aspect ratio being determined by dividing the length in the longitudinal direction by the length in the short direction. It is more preferable that such particles make up 50% or more of the large particles.

The second electrode layer 6 may be configured to include a plurality of layers. These layers may differ from each other in the content of the large particles. In particular, it is preferable that the second electrode layer 6 includes a first layer and a second layer that is closer to the electrolyte layer 4 than the first layer is, and the content of the large particles in the first layer is larger than the content of the large particles in the second layer. In this case, the porosity of the first layer is larger than that of the second layer. That is, the second layer is denser than the first layer. It should be noted that the content of the large particles refers to a ratio of the weight of the large particles to the total weight of the large particles and the small particles. Specifically, it is preferable to set the content of the large particles in the first layer to 30 to 80% and set the content of the large particles in the second layer to 20 to 70%. It should be noted that the number of layers included in the second electrode layer 6 is not limited to two, and may be three or more. When the second electrode layer 6 includes a plurality of layers, the second electrode layer 6 may be configured such that the content of the large particles sequentially increases from the layer closest to the electrolyte layer 4 toward the layer farthest from the electrolyte layer 4.

It is preferable that at least one type of particle out of the small particles and the large particles is made of at least one of a ceria-based oxide, a zirconia-based oxide, and a perovskite composite oxide.

It is preferable that the small particles are made of a ceria-based oxide. For example, it is preferable that the small particles are made of any of GDC (gadolinium-doped ceria), YDC (yttrium-doped ceria), and SDC (samarium-doped ceria).

The small particles may also be made of a zirconia-based oxide. For example, the small particles may also be made of YSZ (yttria-stabilized zirconia) or SSZ (scandium-stabilized zirconia). It should be noted that small particles may also be a mixture of those made of the above-described ceria-based oxide and those made of the above-described zirconia-based oxide.

It is preferable that the large particles are made of a perovskite composite oxide. In particular, it is preferable that the second electrode layer 6 is made of a perovskite oxide that contains two or more elements selected from the group consisting of La, Sr, Sm, Mn, Co, and Fe. For example, the large particles may also be made of LSCF or LSM. Specifically, the large particles may also be made of $(LaSr)(CoFe)O_4$.

The second electrode layer 6 including the above-mentioned substances can function as an air electrode (cathode).

Current Collection Layer

The current collection layer can be formed as a thin layer on/over the second electrode layer 6. Forming the current collection layer makes it possible to form a high-performance electrochemical element with small current collection resistance.

It should be noted that forming the second electrode layer 6 using, as appropriate, a method through which the second electrode layer 6 can be formed at a treatment temperature of 800° C. or higher and lower than 1100° C. makes it possible to suppress grain growth of the particles included in the second electrode layer 6, suppress damage to the metal substrate 1, suppress element interdiffusion between the metal substrate 1 and the first electrode layer 2, and realize an electrochemical element E that has excellent performance and durability, and is thus preferable. For example, the second electrode layer 6 can be formed using, as appropriate, low-temperature heating (not performing heating treatment in a high temperature range of 1100° C. or higher, but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Solid Oxide Fuel Cell

The electrochemical element E configured as described above can be used as a power generating cell for a solid oxide fuel cell. For example, fuel gas containing hydrogen is supplied from the back surface of the metal substrate 1 through the through holes 1a to the first electrode layer 2, air is supplied to the second electrode layer 6 serving as a counter electrode of the first electrode layer 2, and the operation is performed at a temperature of 500° C. or higher and 900° C. or lower, for example. Accordingly, the oxygen $O_2$ included in air reacts with electrons $e^-$ in the second electrode layer 6, thus producing oxygen ions $O^{2-}$. The oxygen ions $O^{2-}$ move through the electrolyte layer 4 to the first electrode layer 2. In the first electrode layer 2, the hydrogen $H_2$ included in the supplied fuel gas reacts with the oxygen ions $O^{2-}$, thus producing water $H_2O$ and electrons $e^-$. With these reactions, electromotive force is generated between the first electrode layer 2 and the second electrode layer 6. In this case, the first electrode layer 2 functions as a fuel electrode (anode) of the SOFC, and the second electrode layer 6 functions as an air electrode (cathode).

Manufacturing Method for Electrochemical Element

Next, a manufacturing method for the electrochemical element E according to this embodiment will be described.

First Electrode Layer Forming Step

In a first electrode layer forming step, the first electrode layer 2 is formed as a thin film in a region that is broader than the region provided with the through holes 1a, on/over the front surface of the metal substrate 1. The through holes of the metal substrate 1 can be provided through laser processing or the like. As described above, the first electrode layer 2 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the first electrode layer forming step.

First, a material paste is produced by mixing powder of the material for forming the first electrode layer 2 and a solvent (dispersion medium), and is applied to the front surface of the metal substrate 1. Then, the first electrode layer 2 is obtained through compression shape forming (electrode layer smoothing step) and heating at a temperature of 1100° C. or lower (electrode layer heating step). Examples of compression shape forming of the first electrode layer 2 include CIP (Cold Isostatic Pressing) shape forming, roll pressing shape forming, and RIP (Rubber Isostatic Pressing) shape forming. It is favorable to perform heating of the electrode layer at a temperature of 800° C. or higher and 1100° C. or lower. The order in which the electrode layer smoothing step and the electrode layer heating step are performed can be changed.

It should be noted that, when an electrochemical element including an intermediate layer is formed, the electrode layer smoothing step and the electrode layer heating step may be omitted, and an intermediate layer smoothing step and an intermediate layer heating step, which will be described later, may include the electrode layer smoothing step and the electrode layer heating step.

It should be noted that lapping shape forming, leveling treatment, surface cutting treatment, surface polishing treatment, or the like can also be performed as the electrode layer smoothing step.

Diffusion Suppressing Layer Forming Step

The metal oxide thin layer 1b (diffusion suppressing layer) is formed on/over the surface of the metal substrate 1 during the heating step in the above-described first electrode layer forming step. It should be noted that it is preferable that the above-mentioned heating step includes a heating step in which the heating atmosphere satisfies the atmospheric condition that the oxygen partial pressure is low because a high-quality metal oxide thin layer 1b (diffusion suppressing layer) that has a high element interdiffusion suppressing effect and has a low resistance value is formed. In a case where a coating method that does not include heating is performed as the first electrode layer forming step, for example, a separate diffusion suppressing layer forming step may also be included. In any case, it is desirable to perform these steps at a temperature of 1100° C. or lower such that damage to the metal substrate 1 can be suppressed. The metal oxide thin layer 1b (diffusion suppressing layer) may be formed on/over the surface of the metal substrate 1 during the heating step in an intermediate layer forming step, which will be described later.

Intermediate Layer Forming Step

In an intermediate layer forming step, the intermediate layer 3 is formed as a thin layer on/over the first electrode layer 2 so as to cover the first electrode layer 2. As described above, the intermediate layer 3 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the intermediate layer forming step. First, a material paste is produced by mixing powder of the material for forming the intermediate layer 3 and a solvent (dispersion medium), and is applied to the front surface of the metal substrate 1. Then, the intermediate layer 3 is obtained through compression shape forming (intermediate layer smoothing step) and heating at a temperature of 1100° C. or lower (intermediate layer heating step). Examples of rolling of the intermediate layer 3 include CIP (Cold Isostatic Pressing) shape forming, roll pressing shape forming, and RIP (Rubber Isostatic Pressing) shape forming. It is favorable to perform heating of the intermediate layer at a temperature of 800° C. or higher and 1100° C. or lower. The reason for this is that this temperature makes it possible to form an intermediate layer 3 that has high strength while suppressing damage to and deterioration of the metal substrate 1. It is more preferable to perform heating of the intermediate layer 3 at a temperature of 1050° C. or lower, and more preferably 1000° C. or lower. The reason for this is that the lower the heating temperature of the intermediate layer 3 is, the more likely it is to further suppress damage to and deterioration of the metal substrate 1 when forming the electrochemical element E. The order in which the intermediate layer smoothing step and the intermediate layer heating step are performed can be changed.

It should be noted that lapping shape forming, leveling treatment, surface cutting treatment, surface polishing treatment, or the like can also be performed as the intermediate layer smoothing step.

Electrolyte Layer Forming Step

In an electrolyte layer forming step, the electrolyte layer 4 is formed as a thin layer on/over the intermediate layer 3 so as to cover the first electrode layer 2 and the intermediate layer 3. The electrolyte layer 4 may also be formed as a thin film having a thickness of 10 µm or less. As described above, the electrolyte layer 4 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

It is desirable to perform a spray coating technique as the electrolyte layer forming step in order to form a high-quality electrolyte layer 4 that is dense and has high gas-tightness and increased gas barrier properties in a temperature range of 1100° C. or lower. In this case, the material for forming the electrolyte layer 4 is sprayed onto the intermediate layer 3 on/over the metal substrate 1, and the electrolyte layer 4 is thus formed.

Reaction Preventing Layer Forming Step

In a reaction preventing layer forming step, the reaction preventing layer 5 is formed as a thin layer on/over the electrolyte layer 4. As described above, the reaction preventing layer 5 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1. It should be noted that leveling treatment, surface cutting treatment, or surface polishing treatment may be performed after the formation of the reaction preventing layer 5, or pressing processing may be performed after wet formation and before heating in order to flatten the upper surface of the reaction preventing layer 5.

Second Electrode Layer Forming Step

In a second electrode layer forming step, the second electrode layer 6 is formed as a thin layer on/over the reaction preventing layer 5. As described above, the second electrode layer 6 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature lower than 1100° C. in order to suppress deterioration of the metal substrate 1 and grain growth of the constituent particles.

When a plurality of layers are formed as the second electrode layer 6, a plurality of layers that differ in form and characteristics can be formed by changing materials to be used and the conditions of layer formation. The following is an example of the case where two layers that differ from each other in the content of the large particle is formed using screen printing. First, a second layer (layer close to the electrolyte layer 4) is formed using screen printing. Next, a first layer is formed using screen printing using a paste in which the content of a material (e.g., LSCF) forming the large particles is larger. Then, heating is performed, and a second electrode layer 6 is thus obtained.

Current Collection Layer Forming Step

In a current collection layer forming step, the current collection layer is formed as a thin layer on/over the second electrode layer 6. As described above, the current collection layer can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of lower than 1100° C. in order to suppress deterioration of the metal substrate 1.

In this manner, the electrochemical element E can be manufactured.

It should be noted that a configuration in which the electrochemical element E does not include both or either of the intermediate layer 3 and the reaction preventing layer 5 is also possible. That is, a configuration in which the first electrode layer 2 and the electrolyte layer 4 are in contact with each other, or a configuration in which the electrolyte layer 4 and the second electrode layer 6 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on/over top of another, but in any case, it is desirable to perform these steps at a temperature of 1100° C. or lower.

EXAMPLES

A metal substrate 1 was produced by providing a plurality of through holes 1a, through laser processing, in the central region of a crofer 22 APU metal plate having a thickness of 0.3 mm.

Next, a paste was produced by mixing 60 wt % of NiO powder and 40 wt % of GDC powder and adding an organic binder and an organic solvent (dispersion medium) thereto. The paste was used to form a first electrode layer 2 on/over a region with a radius of 3 mm from the center of the metal substrate 1. It should be noted that the first electrode layer 2 was formed using screen printing. Then, heating treatment was performed at 950° C. on the metal substrate 1 on/over which the first electrode layer 2 was formed (first electrode layer forming step, diffusion suppressing layer forming step).

Next, a paste was produced by adding an organic binder and an organic solvent (dispersion medium) to fine powder of GDC. The paste was used to form an intermediate layer 3, using screen printing, on a region with a radius of 5 mm from the center of the metal substrate 1 on/over which the first electrode layer 2 was formed. Next, the intermediate layer 3 having a flat surface was formed by performing CIP shape forming on/over the metal substrate 1 on/over which the intermediate layer 3 was formed and then performing heating treatment at 1000° C. (intermediate layer forming step).

Both the first electrode layer 2 and the intermediate layer 3 obtained through the above-described steps had a thickness of about 15 µm. The metal substrate 1 on/over which the first electrode layer 2 and the intermediate layer 3 were formed could be considered as a substrate with an electrode layer having gas permeability.

Subsequently, an electrolyte layer 4 was formed by spraying an 8YSZ (yttria-stabilized zirconia) component with a mode diameter of about 0.7 µm onto a 15 mm×15 mm region of the intermediate layer 3 of the metal substrate 1 so as to cover the intermediate layer 3 while the substrate was moved at a scanning speed of 5 mm/second (spray coating). It should be noted that, at this time, the metal substrate 1 was not heated (electrolyte layer forming step).

The electrolyte layer 4 obtained through the above-described step had a thickness of approximately 9 to 10 µm. The He leakage amount of the metal substrate 1 on/over which the first electrode layer 2, the intermediate layer 3, and the electrolyte layer 4 were formed was measured under a pressure of 0.2 MPa. The determined He leakage amount was smaller than the lower detection limit (1.0 mL/minute·cm$^2$). Accordingly, it was found that the formed electrolyte layer 4 had gas barrier properties.

Next, a paste was produced by adding an organic binder and an organic solvent (dispersion medium) to fine powder of GDC. The paste was used to form a reaction preventing layer 5 on/over the electrolyte layer 4 of the electrochemical element E using screen printing.

Thereafter, the reaction preventing layer 5 having a flat surface was formed by performing CIP shape forming on/over the electrochemical element E on/over which the reaction preventing layer 5 was formed and then performing heating treatment at 1000° C. for 1 hour (reaction preventing layer forming step).

Furthermore, GDC powder whose median particle diameter was 0.15 µm and LSCF powder whose median particle diameter was 0.64 µm were mixed at a weight ratio of 3:7, and an organic binder and an organic solvent (dispersion medium) were added to the mixture to produce a paste. The paste was used to form a second electrode layer 6 on/over the reaction preventing layer 5 using screen printing. Lastly, a final electrochemical element E was obtained by heating, at 900° C., the electrochemical element E on/over which the second electrode layer 6 was formed (second electrode layer forming step).

Hydrogen gas and air were respectively supplied to the first electrode layer 2 and the second electrode layer 6, and the open circuit voltage (OCV) of the obtained electrochemical element E serving as a cell for a solid oxide fuel cell was measured. The result was 1.03 V at 750° C. When an electric current was applied using an electronic load device, output was 0.30 W/cm$^2$ at 0.80 V.

Figure 5:
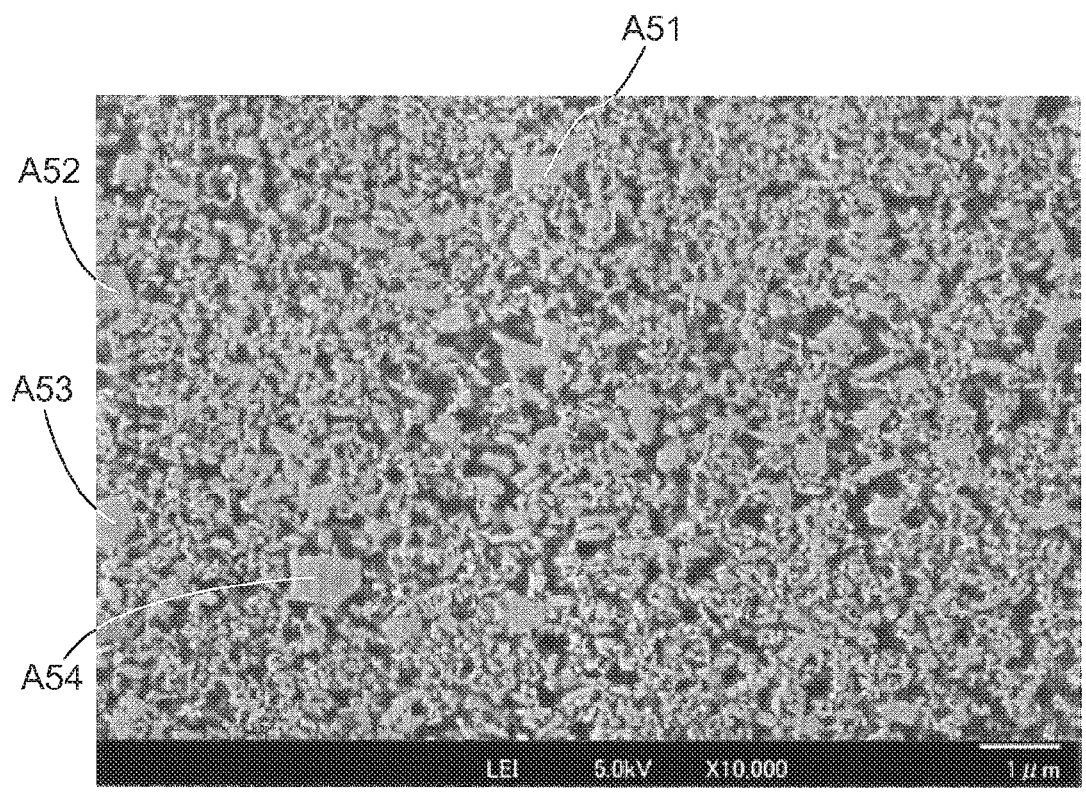
FIG. 5 is an electron micrograph of a cross section of the electrochemical element.
Figure 6:
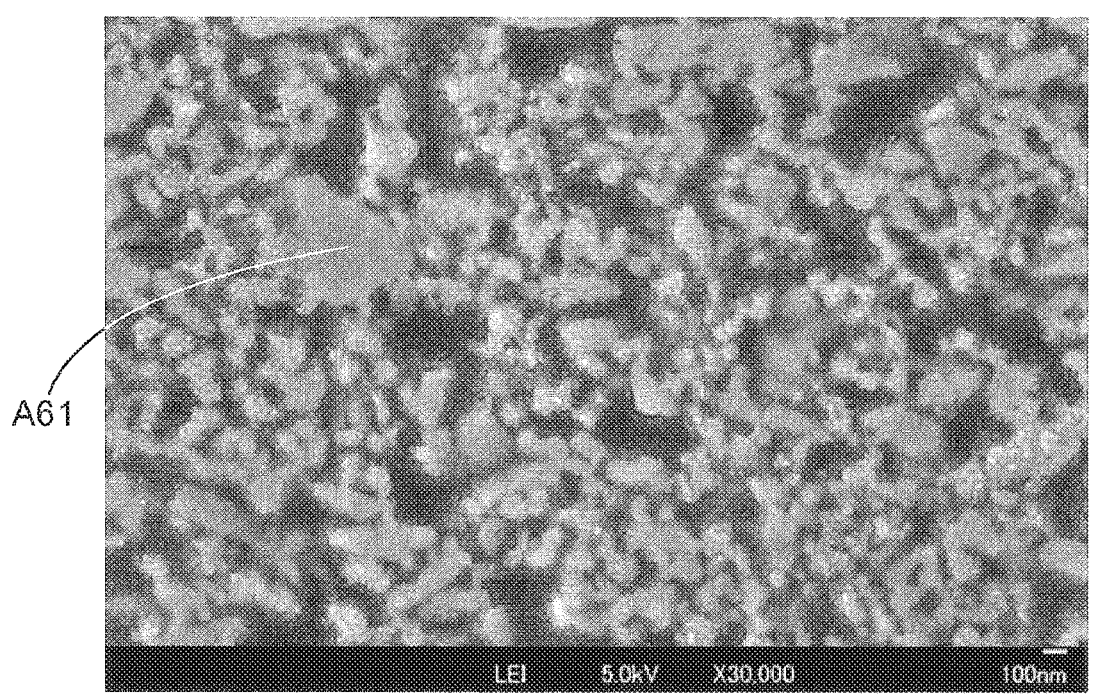
FIG. 6 is an electron micrograph of a cross section of the electrochemical element.

FIGS. 5 and 6 are electron micrographs of a cross section of the electrochemical element E. As is clear from the electron micrographs, the formed second electrode layer 6 was porous. It was determined from the electron micrograph in FIG. 5 that the porosity of the second electrode layer 6 was 26%. In the electron micrograph in FIG. 5, it is observed that particles (A51 to A54) having a particle diameter of 500 nm or more are present, and many particles having a particle diameter of 200 nm or less are present. In the electron micrograph in FIG. 6, it is observed that a particle (A61) having a particle diameter of 500 nm or more is present, and many particles having a particle diameter of 200 nm or less are present. Therefore, it is clear from the electron micrographs in FIGS. 5 and 6 that the second electrode layer 6 contained small particles having a particle diameter of 200 nm or less and large particles having a particle diameter of 500 nm or more.

Figure 7:
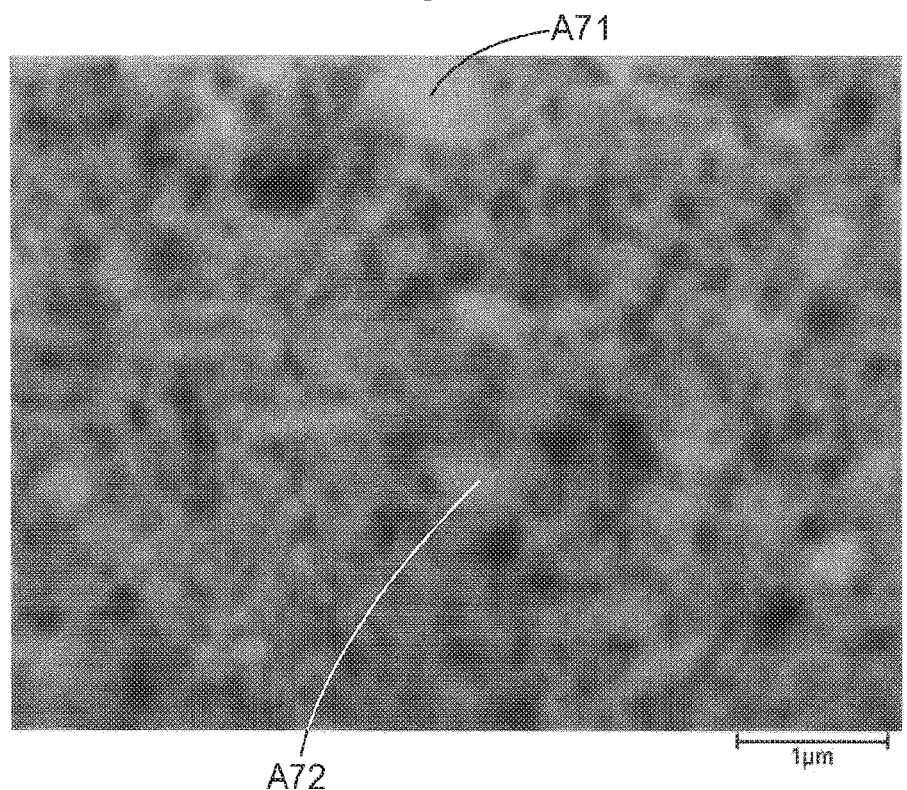
FIG. 7 is an electron micrograph of a cross section of the electrochemical element.
Figure 8:
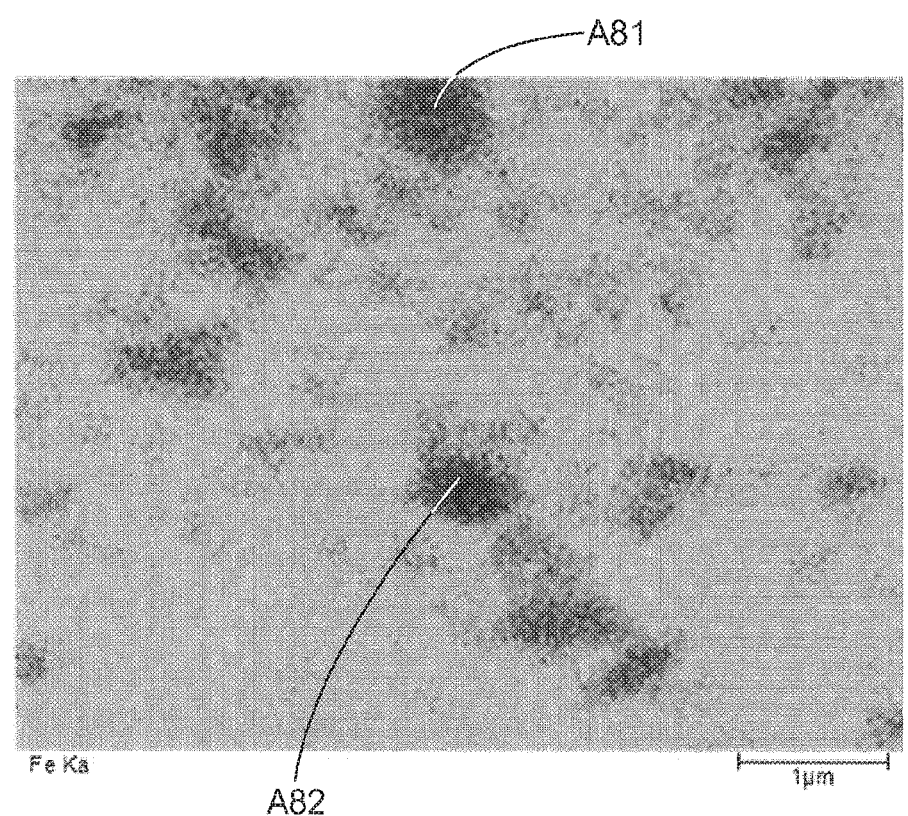
FIG. 8 is an EPMA diagram of a cross section of the electrochemical element.
Figure 9:
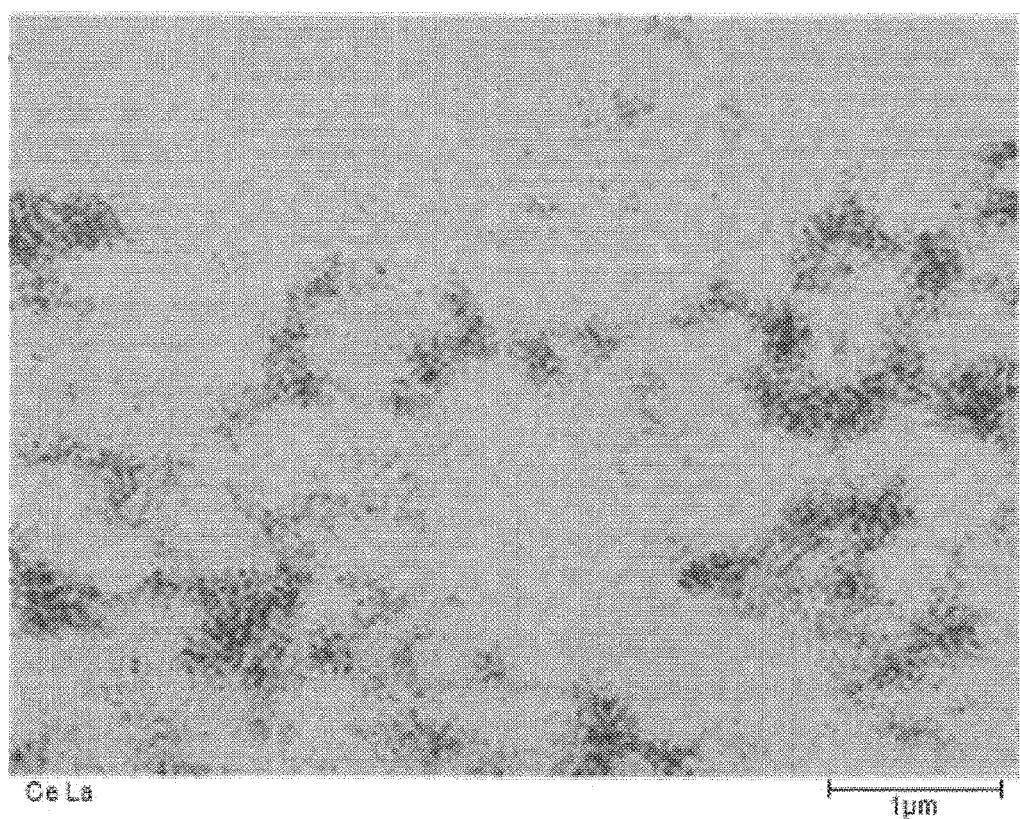
FIG. 9 is an EPMA diagram of the cross section of the electrochemical element.

FIG. 7 is an electron micrograph of the same sample showing another visual field. FIGS. 8 and 9 are EPMA element mapping diagrams showing the same visual field as that in FIG. 7. FIG. 8 shows the distribution of Fe. Fe is a constituent element of LSCF, and therefore, dark colored portions in FIG. 8 correspond to particles derived from the LSCF powder. FIG. 9 shows the distribution of Ce. Ce is a constituent element of GDC, and therefore, dark colored portions in FIG. 9 correspond to particles derived from the GDC powder.

A71 and A72 shown in the electron micrograph of FIG. 7 are particles (large particles) having a particle diameter of 500 nm or more. In FIG. 8, portions (A81 and A82) corresponding to A71 and A72 are dark colored, and Fe is distributed in these portions. In FIG. 9, portions corresponding to A71 and A72 are not dark colored, and Ce is not distributed these portions. Accordingly, it is clear that the large particles A71 and A72 are particles derived from the LSCF powder.

Second Embodiment

An electrochemical element E, an electrochemical module M, an electrochemical device Y, and an energy system Z according to this embodiment will be described with reference to FIGS. 2 and 3.

Figure 2:
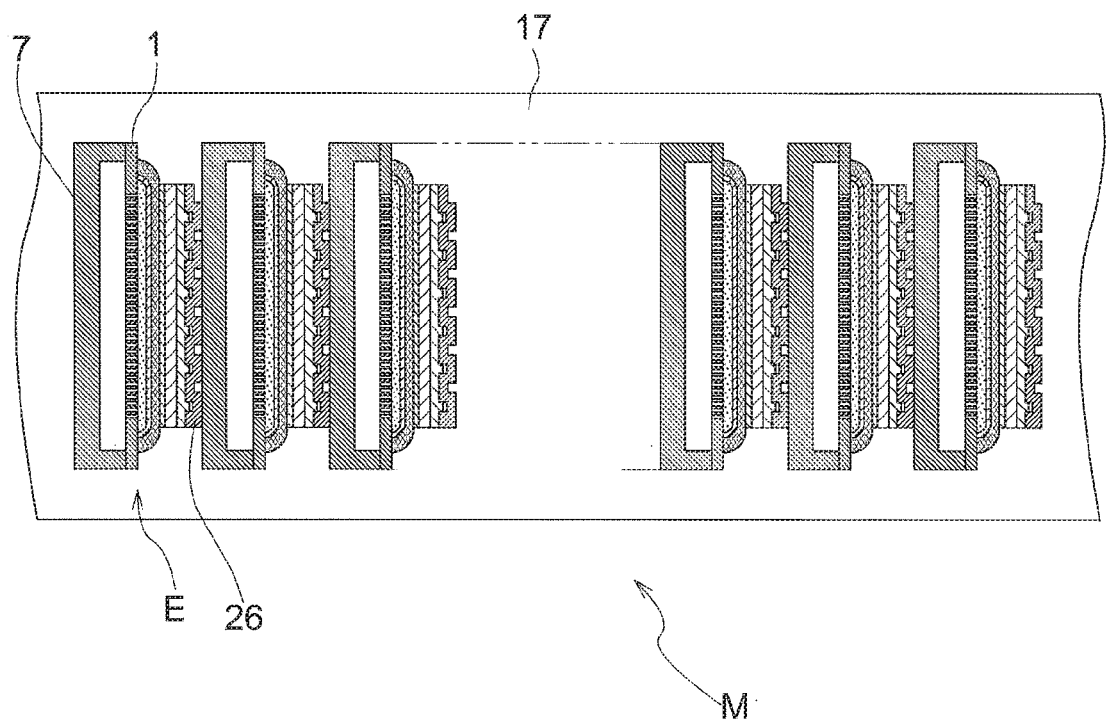
FIG. 2 is a schematic diagram showing configurations of electrochemical elements and an electrochemical module.

As shown in FIG. 2, in the electrochemical element E according to this embodiment, a U-shaped member 7 is attached to the back surface of the metal substrate 1, and the metal substrate 1 and the U-shaped member 7 form a tubular support.

The electrochemical module M is configured by stacking a plurality of electrochemical elements E with collector members 26 being sandwiched therebetween. Each of the collector member 26 is joined to the second electrode layer 6 of the electrochemical element E and the U-shaped member 7, and electrically connects them.

The electrochemical module M includes a gas manifold 17, the collector members 26, a terminal member, and a current extracting unit. One open end of each tubular support in the stack of the plurality of electrochemical elements E is connected to the gas manifold 17, and gas is supplied from the gas manifold 17 to the electrochemical elements E. The supplied gas flows inside the tubular supports, and is supplied to the first electrode layers 2 through the through holes 1a of the metal substrates 1.

Figure 3:
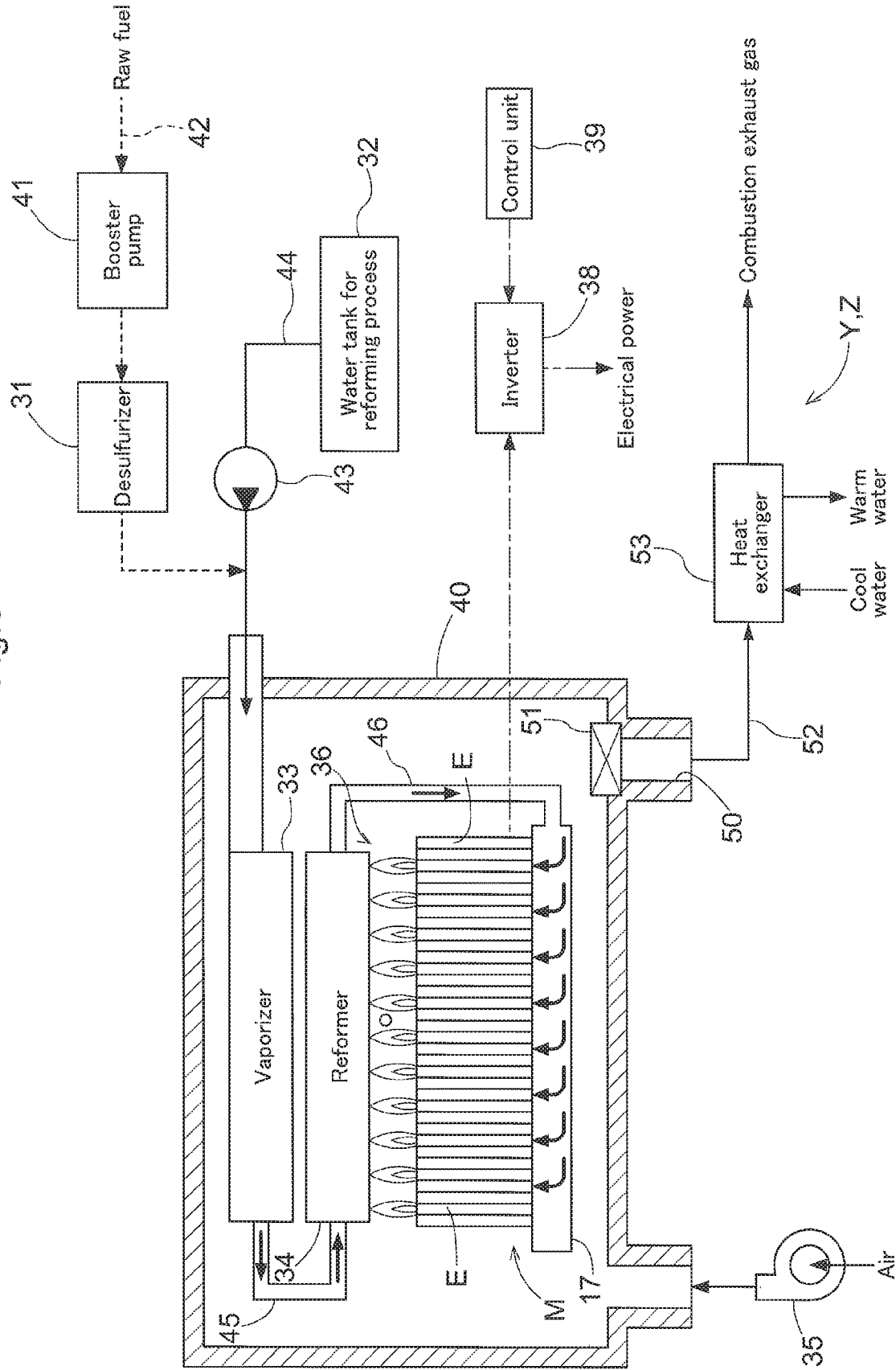
FIG. 3 is a schematic diagram showing configurations of an electrochemical device and an energy system.

FIG. 3 shows an overview of the energy system Z and the electrochemical device Y.

The energy system Z includes the electrochemical device Y, and a heat exchanger 53 serving as a waste heat management unit that reuses heat discharged from the electrochemical device Y.

The electrochemical device Y includes the electrochemical module M, and a fuel supply unit that includes a desulfurizer 31, and a reformer 34 and supplies fuel gas containing a reducible component to the electrochemical module M, and the electrochemical device Y includes an inverter 38 that extracts electrical power from the electrochemical module M.

Specifically, the electrochemical device Y includes the desulfurizer 31, a reformed water tank (water tank for reforming process) 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor from reformed water supplied from the reformed water tank 32. The reformer 34 uses the water vapor produced by the vaporizer 33 to perform steam reforming of the raw fuel desulfurized by the desulfurizer 31, thus producing reformed gas containing hydrogen.

The electrochemical module M generates electricity by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate electricity by causing an electrochemical reaction to occur between the reformed gas supplied via the gas manifold 17 and air supplied from the blower 35.

The inverter 38 adjusts the electrical power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reformation processing on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The reformed water in the reformed water tank 32 is supplied to the vaporizer 33 via a reformed water supply passage 44, due to operation of a reformed water pump 43. The raw fuel supply passage 42 merges with the reformed water supply passage 44 at a location on the downstream side of the desulfurizer 31, and the reformed water and the raw fuel, which have been merged outside of the storage container 40, are supplied to the vaporizer 33 provided in the storage container 40.

The reformed water is vaporized by the vaporizer 33 to produce water vapor. The raw fuel, which contains the water vapor produced by the vaporizer 33, is supplied to the reformer 34 via a vapor-containing raw fuel supply passage 45. In the reformer 34, the raw fuel is subjected to steam reforming, thus producing reformed gas that includes hydrogen gas as a main component (first gas including a reducible component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducible component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducible components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat management unit that reuses heat discharged from the electrochemical device Y.

It should be noted that instead of the waste heat management unit, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to achieve effective energy utilization by heat utilization through combustion, power generation in a fuel cell, or the like.

Third Embodiment

Figure 4:
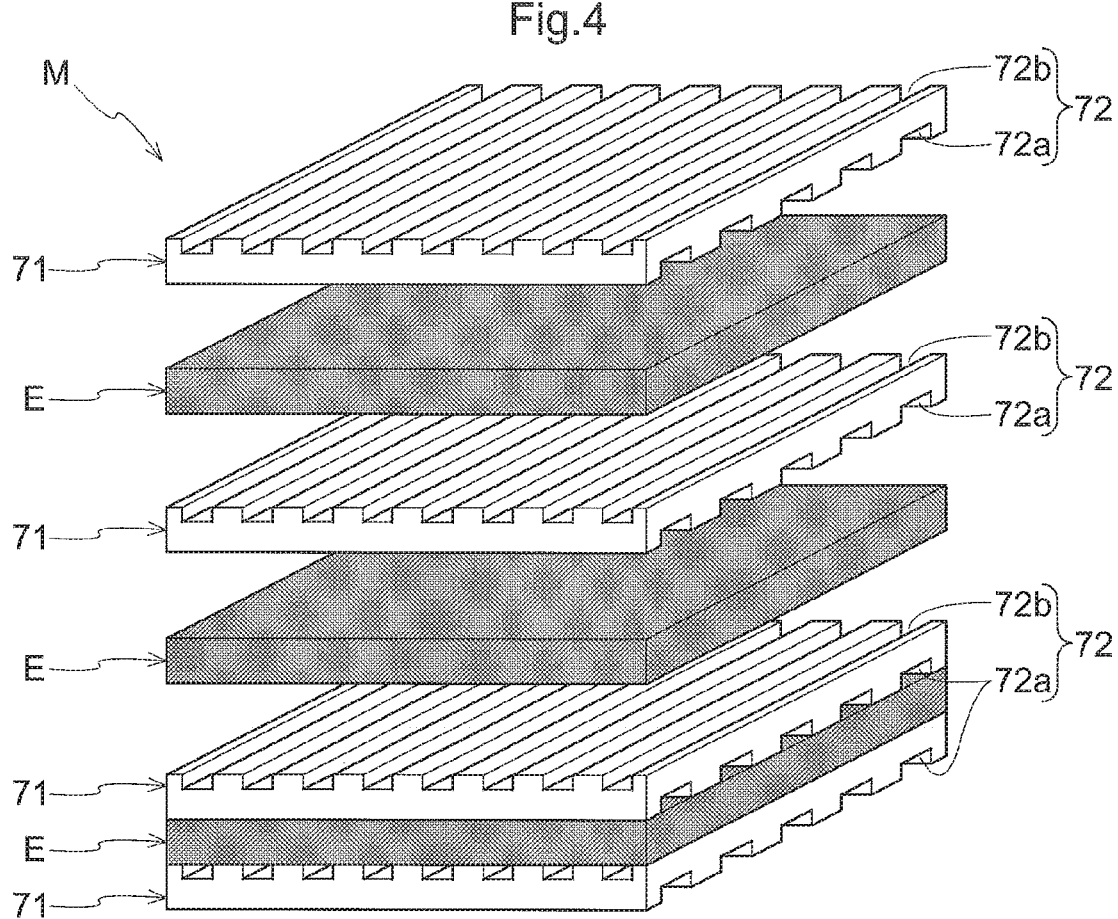
FIG. 4 is a schematic diagram showing a configuration of an electrochemical module.

FIG. 4 shows another embodiment of the electrochemical module M. The electrochemical module M according to this embodiment is configured by stacking the above-described electrochemical elements E with cell connecting members 71 being sandwiched therebetween.

The cell connecting members 71 are each a plate-shaped member that has electron conductivity and does not have gas permeability, and the upper surface and the lower surface are respectively provided with grooves 72 that are orthogonal to each other. The cell connecting members 71 can be formed using a metal such as stainless steel or a metal oxide.

As shown in FIG. 4, when the electrochemical elements E are stacked with the cell connecting members 71 being sandwiched therebetween, a gas can be supplied to the electrochemical elements E through the grooves 72. Specifically, the grooves 72 on one side are first gas passages 72a and supply gas to the front side of one electrochemical element E, that is to say the second electrode layer 6. The grooves 72 on the other side are second gas passages 72b and supply gas from the back side of one electrochemical element E, that is, the back side of the metal substrate 1, through the through holes 1a to the first electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated electrical power is extracted to the outside of the electrochemical module M from the cell connecting members 71 at the two ends of the stack of electrochemical elements E.

It should be noted that although the grooves 72 that are orthogonal to each other are respectively formed on the front surface and the back surface of each of the cell connecting members 71 in this embodiment, grooves 72 that are parallel to each other can be respectively formed on the front surface and the back surface of each of the cell connecting members 71.

Other Embodiments (1) Although the electrochemical elements E are used in a solid oxide fuel cell in the above-described embodiments, the electrochemical elements E can also be used in a solid oxide electrolytic cell, an oxygen sensor using a solid oxide, and the like.

(2) Although the present application is applied to a metal-supported solid oxide fuel cell in which the metal substrate 1 serves as a support in the above-described embodiments, the present application can also be applied to an electrode-supported solid oxide fuel cell in which the first electrode layer 2 or second electrode layer 6 serves as a support, or an electrolyte-supported solid oxide fuel cell in which the electrolyte layer 4 serves as a support. In such cases, the functions of a support can be obtained by forming the first electrode layer 2, second electrode layer 6, or electrolyte layer 4 to have a required thickness.

(3) In the above-described embodiments, a composite material such as NiO-GDC, Ni-GDC, NiO—YSZ, Ni—YSZ, CuO—CeO$_2$, or Cu—CeO$_2$ is used as the material for forming the first electrode layer 2, and a complex oxide such as LSCF or LSM is used as the material for forming the second electrode layer 6. With this configuration, the first electrode layer 2 serves as a fuel electrode (anode) when hydrogen gas is supplied thereto, and the second electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the first electrode layer 2 can be used as an air electrode and the second electrode layer 6 can be used as a fuel electrode. That is, a complex oxide such as LSCF or LSM is used as the material for forming the first electrode layer 2, and a composite material such as NiO-GDC, Ni-GDC, NiO—YSZ, Ni—YSZ, CuO—CeO$_2$, or Cu—CeO$_2$ is used as the material for forming the second electrode layer 6. With this configuration, the first electrode layer 2 serves as an air electrode when air is supplied thereto, and the second electrode layer 6 serves as a fuel electrode when hydrogen gas is supplied thereto, thus making it possible to use the electrochemical element E as a cell for a solid oxide fuel cell.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

LIST OF REFERENCE NUMERALS

1: Metal substrate (metal support)
1a: Through hole
2: Electrode layer
3: Intermediate layer
4: First electrolyte layer (counter electrode layer, fuel electrode layer)
4a: Upper surface of electrolyte layer
5: Reaction preventing layer
6: Second electrode layer (electrode layer, air electrode layer)
B: Substrate with electrode layer
E: Electrochemical element
M: Electrochemical module
Y: Electrochemical device
Z: Energy system

The invention claimed is:

1. An electrochemical element comprising an electrode layer, the electrochemical element being a power generating cell for a solid oxide fuel cell or a solid oxide electrolytic cell, the electrochemical element comprising:
an electrode layer, wherein the electrode layer contains small particles and large particles in a mixed state,
the small particles have a particle diameter of 200 nm or less in the electrode layer,
the large particles have a particle diameter of 500 nm or more in the electrode layer,
the electrode layer is an air electrode layer,
the electrode layer has a thickness of 1 μm to 100 μm, and
wherein a material forming the small particles and a material forming the large particles are different from each other; and wherein the electrode layer has a porosity of 20% or more and 40% or less.

2. The electrochemical element according to claim 1, wherein at least one type of particle out of the small particles and the large particles is made of at least one of a ceria-based oxide, a zirconia-based oxide, and a perovskite composite oxide.

3. The electrochemical element according to claim 1, wherein the large particles are made of a perovskite composite oxide.

4. The electrochemical element according to claim 1, wherein 50% or more of the large particles contained in the electrode layer have an aspect ratio of 2 or more, the aspect ratio being determined by dividing a length in a longitudinal direction by a length in a short direction.

5. The electrochemical element according to claim 1, wherein the electrode layer includes a plurality of layers.

6. The electrochemical element according to claim 1, comprising an electrolyte layer,
wherein the electrode layer includes a first layer and a second layer that is closer to the electrolyte layer than the first layer is, and
a content of the large particles in the first layer is larger than a content of the large particles in the second layer.

7. The electrochemical element according to claim 1, comprising:
an electrolyte layer; and
a reaction preventing layer that is arranged between the electrode layer and the electrolyte layer.

8. The electrochemical element according to claim 1, comprising:
an electrolyte layer; and
a counter electrode layer that is arranged on a side opposite to the electrode layer with respect to the electrolyte layer.

9. The electrochemical element according to claim 1, comprising a current collection layer having electron conductivity, on/over a surface of the electrode layer on a side opposite to the electrolyte layer.

10. The electrochemical element according to claim 1, which is supported by a metal support.

11. An electrochemical module in which a plurality of the electrochemical elements according to claim 1 are arranged in an assembled state.

12. A solid oxide fuel cell comprising:
the electrochemical element according to claim 1,
wherein a power generation reaction is caused in the electrochemical element.

13. A manufacturing method for the electrochemical element according to claim 1,
wherein heating of the electrode layer is performed at a temperature of 800° C. or higher and lower than 1100° C.

* * * * *